United States Patent

Trowbridge et al.

[11] 3,764,194
[45] Oct. 9, 1973

[54] BIOCULAR MAGNIFIER
[75] Inventors: Bruce D. Trowbridge, Greendale; Klaus J. Ness, Cudahy, both of Wis.
[73] Assignee: General Motors Corporation, Detroit, Mich.
[22] Filed: May 1, 1972
[21] Appl. No.: 248,818

[52] U.S. Cl............................. 350/96 B, 350/175 E
[51] Int. Cl........................ G02b 5/16, G02b 25/00
[58] Field of Search....................... 350/96 B, 175 E

[56] References Cited
UNITED STATES PATENTS
3,187,627  6/1965  Kapany ......................... 350/96 B X
3,614,209  10/1971  Seaman......................... 350/175 E X
3,663,092  5/1972  Schlegel ....................... 350/175 E X Primary Examiner—David H. Rubin
Attorney—Jean L. Carpenter et al.

[57] ABSTRACT

A biocular magnifier having a large apparent field, a magnification of 10X and an exit pupil of about 80 millimeters comprises a fiber optic magnifying element providing an image magnification of 2X and an eyepiece providing an magnification of 5X. The eyepiece element nearest the fiber optic cone is a prism which affords a right angle bend in the optical path.

1 Claim, 1 Drawing Figure

PATENTED OCT 9 1973  3,764,194
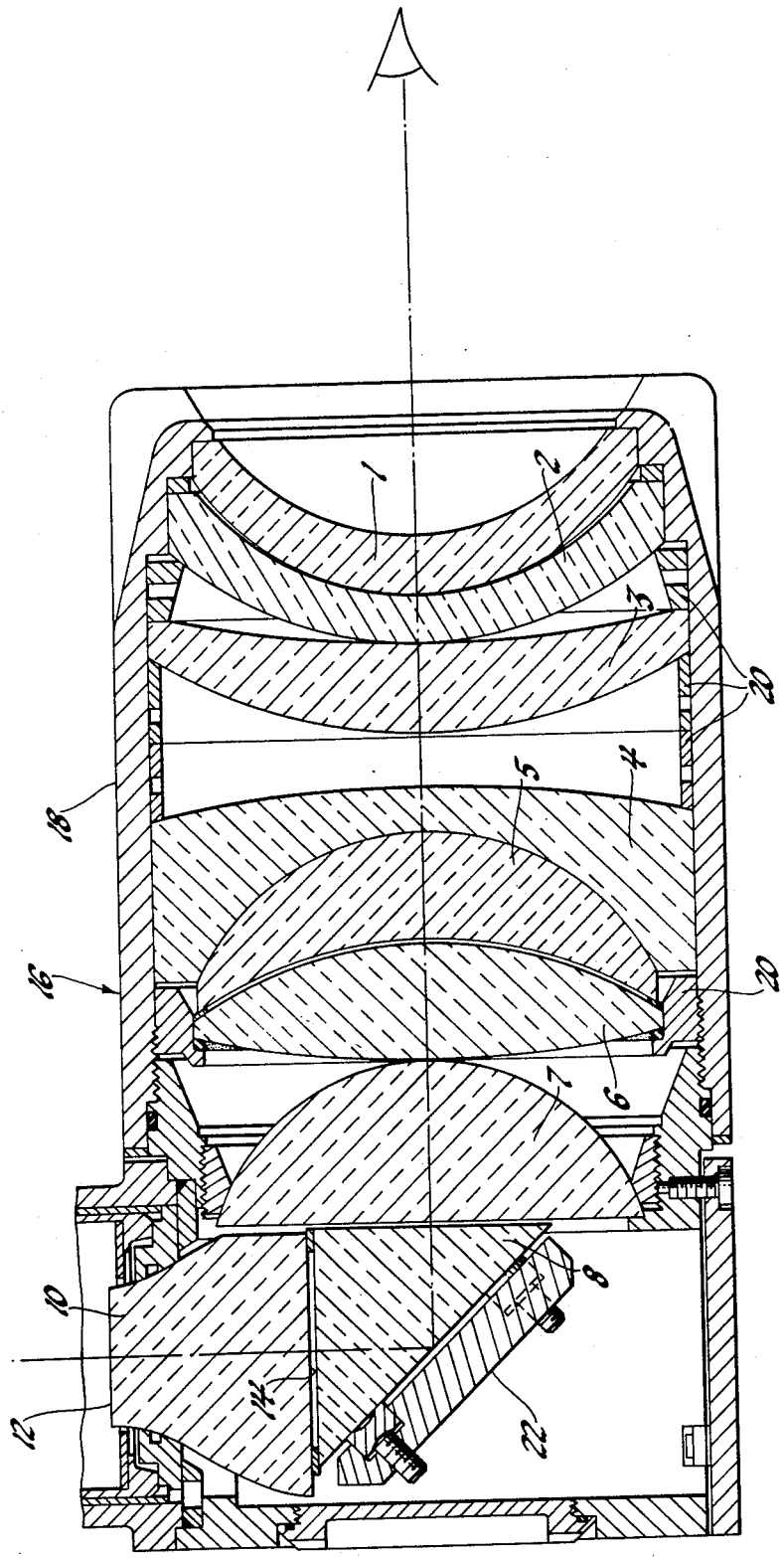

BIOCULAR MAGNIFIER

This invention herein described was made in the course of work under a contract or subcontract thereunder with the Department of Defense.

This invention relates to a biocular magnifier comprising in combination a fiber optic magnifier in combination with a magnifying eyepiece.

It is often desirable as, for example, in a periscope for a military tank, to provide an optical system for use by both eyes of the observer providing a large eye relief, a large exit pupil, a large magnification and a large field of view.

It is therefore a general object of this invention to provide a biocular magnifier having a large eye relief and a magnification on the order of 10x.

It is a further object to provide a biocular magnifier comprising a fiber optic magnifier element in series with a magnifier eyepiece.

It is another object of the invention to provide a biocular magnifier with a large exit pupil and a large apparent field.

The invention is carried out by providing a fiber optic magnifier for magnifying an image projected on one end thereof and an eyepiece for magnifying the image from the other side of the magnifier, the eyepiece providing a large exit pupil, large eye relief and a large apparent field.

The above and other advantages will be made more apparent from the following specification taken in conjunction with the accompanying drawing which is a cross-sectional view of the biocular magnifier according to the invention.

A fiber optic magnifying element 10 is generally in the form of a truncated cone or taper and has a small upper face 12 and an enlarged lower face 14 of twice the diameter of the upper face such that when an image is projected or otherwise formed on the upper face, the image will be transferred to the lower face 14 and magnified by a factor of 2. The magnifying element 10 is composed of a large number of fiber optic filaments each having a diameter of 0.005 to 0.01 millimeters at the small end of the element and provides a resolution of better than 50 line pairs per millimeter. The fibers have a numerical aperture of about 1 at the small end and 0.5 at the large end. Thus the brightness of the transferred image does not decrease as a factor of four as might be expected with a magnification of 2X but decreases by a much smaller amount since the 0.5 numerical aperture affords an efficient utilization of the light by the following eyepiece. Actual measurements show the brightness to decrease by a factor of about 3 due to the magnification and light transmission losses within the element 10. The distortion of the magnifying element is less than 5 percent.

A magnifying eyepiece 16 having a power of 5X further magnifies the image of the face 14. The eyepiece is designed in such a manner as to provide an apparent field up to 55°, an eye relief of 67.2 mm. and a large exit pupil. Due to the inclusion of a prism in the eyepiece the exit pupil is rectangular and has the dimensions of 80 mm. horizontally and 40 mm. vertically. The eyepiece comprises a housing 18 containing 7 lens elements numbered 1 – 7 and a reflecting prism element 8 to the rear of the lens elements and adjacent the fiber optic magnifier 10. The lens elements are secured by a plurality of mounts and spacers 20 while the prism 8 is mounted on a support 22. The following table provides a specification of the eyepiece:

| | | | |
|---|---|---|---|
| $r_1 = -63.95$ | $d_1 = 15.9$ | $N_1 = 1.607$ | $V_1 = 56.7$ |
| $r_2 = -67.48$ | $d_2 = 0.03$ | | |
| $r_3 = -71.6$ | $d_3 = 11.66$ | $N_2 = 1.517$ | $V_2 = 64.2$ |
| $r_4 = -100.6$ | $d_4 = 0.039$ | | |
| $r_5 = -315.6$ | $d_5 = 22.22$ | $N_3 = 1.755$ | $V_3 = 27.6$ |
| $r_6 = -133.4$ | $d_6 = 13.76$ | | |
| $r_7 = 341.8$ | $d_7 = 10.93$ | $N_4 = 1.755$ | $V_4 = 27.6$ |
| $r_8 = 65.36$ | $d_8 = 0$ | | |
| $r_9 = 65.36$ | $d_9 = 28.85$ | $N_5 = 1.689$ | $V_5 = 49.5$ |
| $r_{10} = 107.27$ | $d_{10} = 0.013$ | | |
| $r_{11} = 107.27$ | $d_{11} = 29.38$ | $N_6 = 1.564$ | Vhd 6 = 60.8 |
| $r_{12} = -278.81$ | $d_{12} = 0.03$ | | |
| $r_{13} = 56.58$ | $d_{13} = 40.19$ | $N_7 = 1.589$ | $V_7 = 61.3$ |
| $r_{14} = -2566.$ | $d_{14} = 0.015$ | | |
| $r_{15} = \infty$ | $d_{15} = 59.$ | $N_8 = 1.755$ | $V_8 = 27.6$ |
| $r_{16} = \infty$ | $d_{16} = 0.01$ (to image plane) | | | wherein $r_n$ is the radius of curvature expressed in millimeters of the subscript designated element face, the faces being numbered consecutively 1 – 16, beginning with the face nearest the exit pupil, $d_n$ is the axial spacing in millimeters between the subscript designated element face and the next successive element face, $N_n$ is the index of refraction of the designated element as numbered in the drawing, and $V_n$ is the Abbe number of the subscript designated element.

The resultant assembly has a resolution much greater than 45 line pairs per millimeter and a magnification of 10X. The use of the 2X fiber optic magnifier makes possible the attainment of a 10X biocular system in an economical way since the design difficulty and expense of fabricating a 10X eyepiece is very much greater than for the 5X eyepiece. On the other hand, the 2X fiber optic magnifier is considered to be optimum since those with higher magnification are dramatically higher in cost and lower in light transmitting efficiency. Thus the system according to the invention takes advantage of the features of the fiber optic magnifier and an eyepiece and strikes a practical balance between the two.

the embodiment of the invention described herein is for purposes of illustration and the scope of the invention is intended to be limited only by the following claims:

What is claimed is:

1. A biocular magnifier for magnifying an image comprising, in combination
   a fiber optic magnifier having a small end located in the plane of the image for transferring the image in enlarged form to a large end, and
   a biocular magnifying eyepiece for further enlarging the transferred image and having an exit pupil on the order of 80 millimeters and an eye relief of about 67 millimeters, the eyepiece comprising eight elements successively designated from the pupil side as the first to eighth and having faces successively designated from the pupil side as the first to the sixteenth, the eyepiece possessing the following dimensions and relationships:

| | | | |
|---|---|---|---|
| $r_1 = -63.95$ | $d_1 = 15.9$ | $N_1 = 1.607$ | $V_1 = 56.7$ |
| $r_2 = -67.48$ | $d_2 = .03$ | | |
| $r_3 = -71.6$ | $d_3 = 11.66$ | $N_2 = 1.517$ | $V_2 = 64.2$ |
| $r_4 = -100.6$ | $d_4 = .039$ | | |
| $r_5 = -315.6$ | $d_5 = 22.22$ | $N_3 = 1.755$ | $V_3 = 27.6$ |
| $r_6 = -133.4$ | $d_6 = 13.76$ | | |
| $r_7 = 341.8$ | $d_7 = 10.93$ | $N_4 = 1.755$ | $V_4 = 27.6$ |
| $r_8 = 65.36$ | $d_8 = 0$ | | |
| $r_9 = 65.36$ | $d_9 = 28.85$ | $N_5 = 1.689$ | $V_5 = 49.5$ |
| $r_{10} = 107.27$ | $d_{10} = 0.013$ | | |
| $r_{11} = 107.27$ | $d_{11} = 29.38$ | $N_6 = 1.564$ | $V_6 = 60.8$ |
| $r_{12} = -278.81$ | $d_{12} = 0.03$ | | |
| $r_{13} = 56.58$ | $d_{13} = 40.19$ | $N_7 = 1.589$ | $V_7 = 61.3$ |
| $r_{14} = -2566.$ | $d_{14} = 0.015$ | | |
| $r_{15} = \infty$ | $d_{15} = 59.$ | $N_8 = 1.755$ | $V_8 = 27.6$ |

$r_{16} = \infty$    $d_{16} = 0.01$ (to image plane)

wherein $r_n$ is radius of curvature in millimeters of the subscript designated element face, $d_n$ is the axial spacing in millimeters between the subscript designated element face and the next successive element face, $N_n$ is the index of refraction of the designated elements, and $V_n$ is the Abbe number of the subscript designated element.

* * * * *